United States Patent [19]

Sakamoto et al.

[11] Patent Number: 4,903,398
[45] Date of Patent: Feb. 27, 1990

[54] BALANCE WEIGHT FITTING APPARATUS

[75] Inventors: Shunji Sakamoto, Higashihiroshima; Hisao Miyahara, Hiroshima, both of Japan

[73] Assignee: Mazda Motor Corporation, Hiroshima, Japan

[21] Appl. No.: 158,970

[22] Filed: Feb. 23, 1988

[30] Foreign Application Priority Data

Feb. 24, 1987 [JP] Japan .................. 62-26207/87[u]
Feb. 24, 1987 [JP] Japan .................. 62-26208/87[U]
Feb. 24, 1987 [JP] Japan .................. 62-40675/87

[51] Int. Cl.$^4$ .................................. B23P 21/00
[52] U.S. Cl. .................................. 29/703; 29/705; 29/712; 29/720; 29/818; 73/468
[58] Field of Search ............. 29/407, 430, 453, 703, 29/705, 712, 818, 720, DIG. 95; 73/458, 468, 470; 301/5 B

[56] References Cited

U.S. PATENT DOCUMENTS

| | | | |
|---|---|---|---|
| 2,696,408 | 12/1954 | Merriman | 301/5 B |
| 3,623,208 | 11/1971 | Hofmann | 29/407 |
| 3,748,910 | 7/1973 | Hofmann | 73/468 |
| 4,554,734 | 11/1985 | Sander | 29/818 |

FOREIGN PATENT DOCUMENTS 61-33301 2/1986 Japan .

*Primary Examiner*—Mark Rosenbaum
*Assistant Examiner*—Frances Chin
*Attorney, Agent, or Firm*—Fleit, Jacobson, Cohn, Price, Holman & Stern

[57] ABSTRACT

An apparatus for fitting proper sizes of balance weights to the inner and outer rims of a wheel at proper positions. The apparatus includes a wheel balance measuring station and a balance weight fitting station arranged side by side. In the balance weight measuring station, the wheel is measured to detect unbalance of the wheel so as to determine sizes of balance weights to be fitted to the rims and positions at which the balance weights are fitted. According to the determination, weight size signals and position signals are provided and sent to the balance weight fitting station. In the balance weight fitting station, upper and lower balance weight handling devices electromagnetically pick up the determined sizes of balance weights among various sizes of balance weights supplied by upper and lower balance weight supplying devices according to the weight size signals; and upper and lower balance weight fitting devices receive the electromagnetically picked up balance weights and bring them above and below the outer and inner rims of the wheel, respectively, according to the position signals. The upper balance weight fitting device descends to fit the determined size of balance weight to the outer rim edge of the wheel at the determined position. On the other hand, the lower balance weight fitting device turns upside down and then ascends to fit the determined size of balance weight to the inner rim edge of the wheel, thereby finishing the fitting of the balance weights to the wheel.

5 Claims, 13 Drawing Sheets

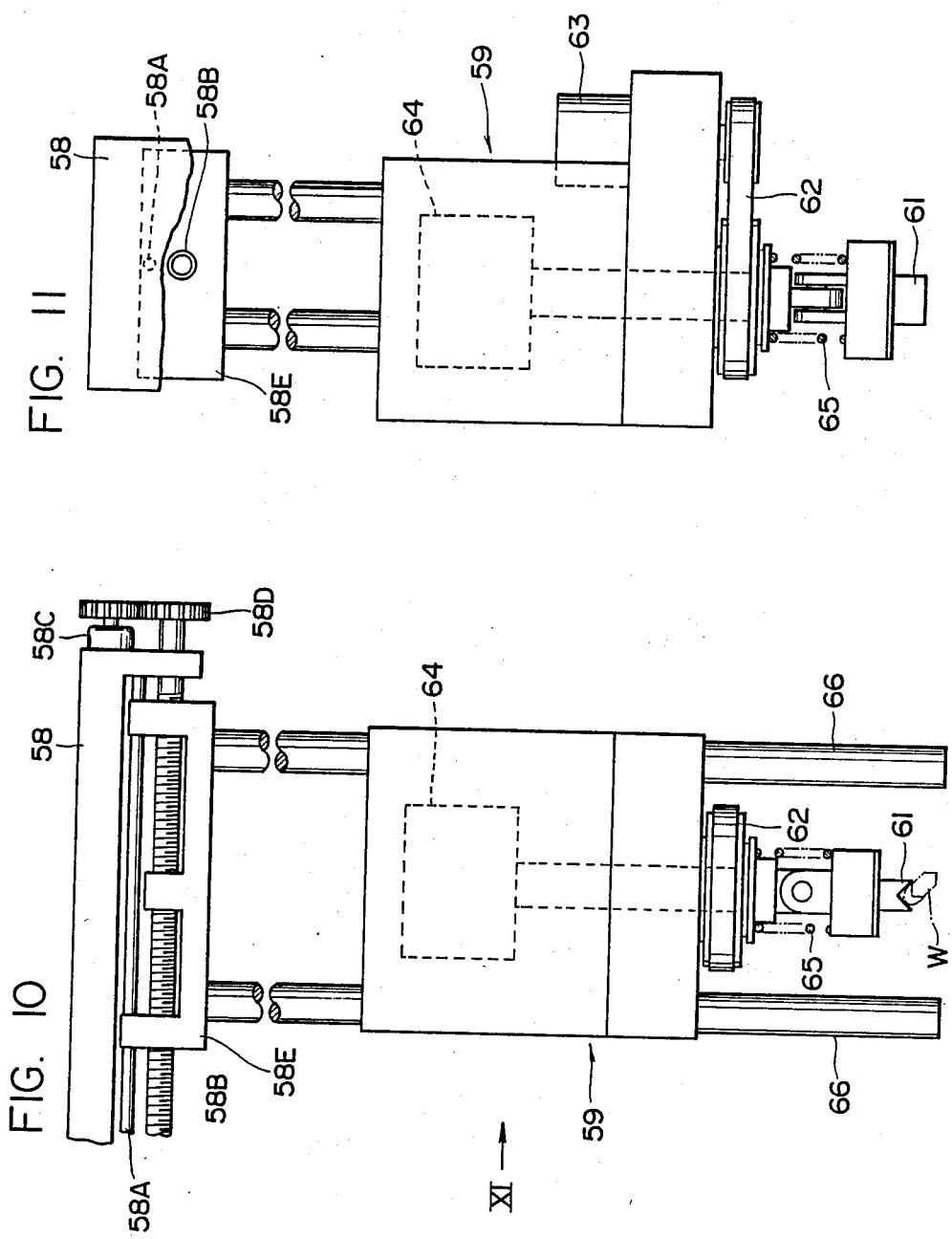

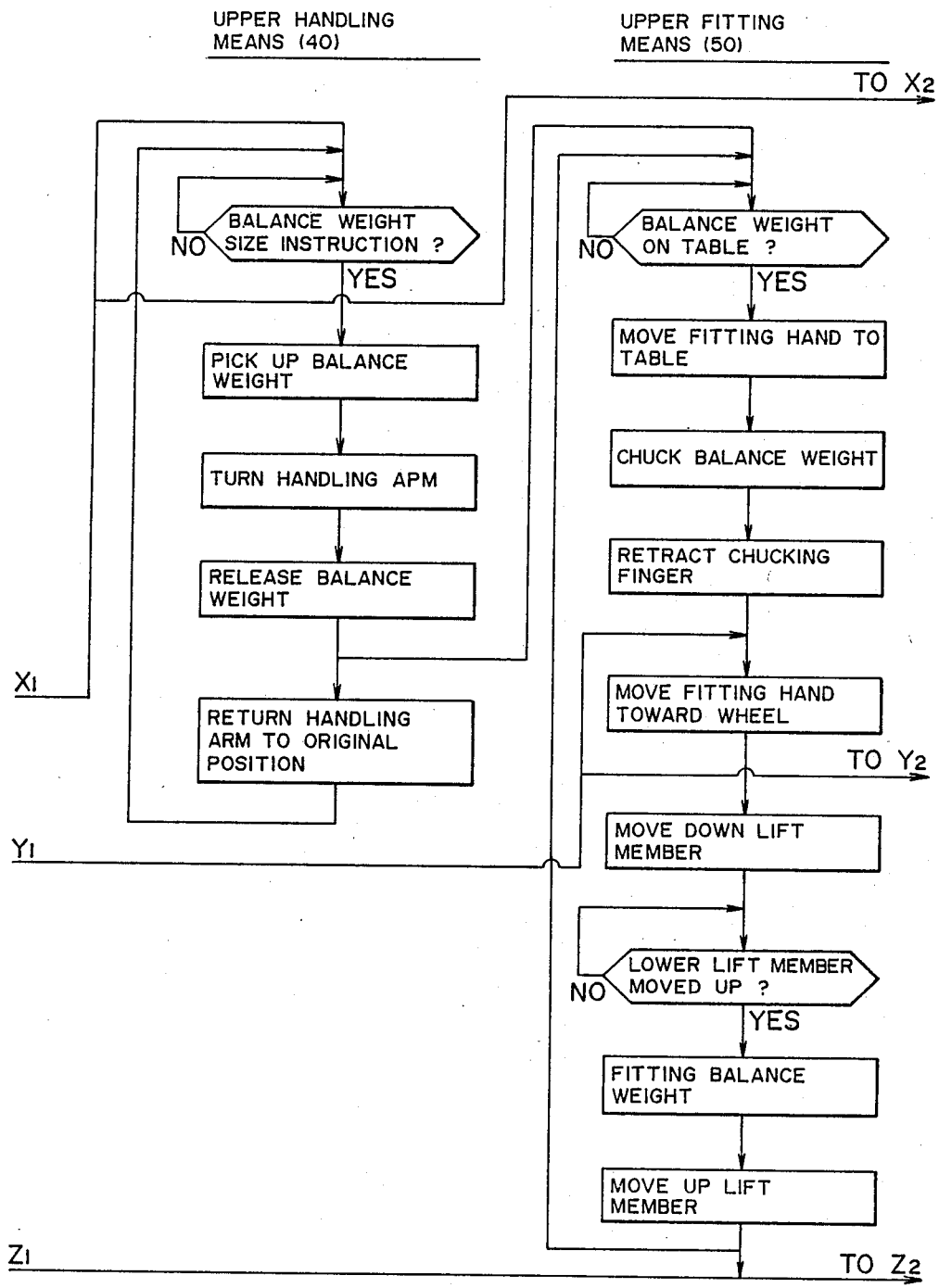

BALANCE WEIGHT FITTING APPARATUS

BACKGROUND OF THE INVENTION

The present invention relates to an apparatus for automatically fitting balance weights to the rim edge of a wheel of a vehicle.

Various apparatus have heretofore been used automatically to clip or fit a balance weight to an inner or an outer rim of a vehicle wheel. One such apparatus is disclosed in Japanese Patent Unexamined Publication No. 61-33,301, entitled "Road Wheel Balance Weight Fitting Apparatus", issued Feb. 17, 1986. In the apparatus taught by the above-mentioned Japanese Patent Unexamined Publication, a wheel is measured by means of a so-called balancer to detect unbalance thereof. According to the result of the balance measurement, one or more balance weights are fitted to an outer rim of the wheel at one fitting station and, thereafter, to an inner rim of the wheel at another fitting station.

It is obvious that this known balance weight fitting apparatus including at least two fitting stations precludes a production line of wheel assemblies, in the manner of a conveyer-line, for producing a high volume wheel output and that a large space is needed to install the two-station balance weight fitting apparatus.

Meanwhile, the balance weight fitting apparatus of the type having a program-controlled balance weight fitting means needs the provision of balance weight feeding devices such as a plurality of vibrating feeding buckets for feeding various sizes or grades of balance weights. When setting a pick-up point at which the fitting means grasps or picks up a specific balance weight near a wheel placed at the balance weight fitting station, a plurality of chutes connecting the vibrating feeding buckets and the pick-up point are disposed close together around the wheel and the fitting means. These closely disposed chutes make it hard to repair or maintain the fitting means. If setting the pick-up point far from the wheel for easy access to the fitting means, the fitting means is required to move a long distance between the pick-up position and the wheel, resulting in not only a complicated bulky fitting means but also a time consuming balance weight fitting operation.

In such balance weight fitting apparatus, various sizes of balance weights are fed by balance weight supplying apparatus including a plurality of feeding devices such as vibrating buckets or cartridges. In each bucket or cartridge, the same size of balance weights are contained and supplied one by one toward the pick-up point therefrom. Specifically, the balance weights stacked in the cartridge are pushed out, the lowermost one first. A problem associated with such cartridge is a small number of balance weights stacked therein. Cartridges which contain therein balance weights of sizes which are frequently used have to be often exchanged, resulting in a troublesome operation. On the other hand, because the vibrating bucket type of feeding device is expensive, the provision of a plurality of the vibrating buckets for all sizes of balance weights makes the balance weight fitting apparatus costly and troublesome in maintenance operation.

OBJECT OF THE INVENTION

It is, therefore, an object of the present invention to provide a one-station balance weight fitting apparatus.

It is another object of the present invention to provide a one-station balance weight fitting apparatus in which balance weights can be fitted to the inner and outer rims of a wheel all at once.

It is still another object of the present invention to provide a balance weight fitting apparatus which allows an efficient balance weight fitting operation.

SUMMARY OF THE INVENTION

For accomplishing the above and other objects, the balance weight fitting apparatus enables selecting a balance weight of a size most suitable for correcting unbalance of a wheel among various sizes of balance weights, and clipping or fitting the selected balance weight to the rim of the wheel at a most suitable position for balancing the wheel. The size of balance weight to be fitted and the position at which the balance weight is fitted to the rim of the wheel are determined at a balance weight measuring station by a balancer which itself is well known in the art.

According to the present invention, the balance weight fitting apparatus includes a balance measuring station where a wheel is measured to detect unbalance thereof by means of a balancer well known in the art per se so as to determine a size or grade of balance weight to be fitted to the wheel and an angular position on the rim of the wheel at which the determined size of balance weight is fitted to the rim of the wheel, and a balance weight fitting station where upper and lower balance weight fitting means are disposed opposite to each other to fit balance weights determined in the balance weight measuring station to the inner and outer rim edges of the wheel at the determined angular positions.

Each of the upper and lower balance weight fitting means picks up selectively the determined size of balance weight among various sizes of balance weights according to information on weight size provided from the balance weight measuring station, turns angularly around the wheel to the determined position of the rim of the wheel according to information on angular positions provided the balance weight measuring station and then fits the balance to the rim edge of the wheel.

According to a preferred embodiment of the present invention, for supplying various sizes of balance weights, there are upper and lower balance weight supplying means each of which comprises a plurality of balance weight feeding devices for feeding various sizes of balance weights onto a pick-up table provided inside the balance weight fitting station. This balance weight feeding device includes a vibrating type and a cartridge type balance feeder for feeding balance weights used in a high and a low frequency, respectively. Between the pick-up table and the balance weight fitting means there is a balance weight handling means for picking up and transferring the determined weight size of balance weight placed on the pick-up table to the balance weight fitting means.

BRIEF DESCRIPTION OF THE DRAWINGS

These and other objects and features of the present invention will become apparent from the following description taken in conjunction with reference to the accompanying drawings, in which like reference characters designate corresponding elements, parts, or sections throughout several views and wherein:

FIG. 10 side view of a upper balance weight fitting hand;

FIG. 11 is a front view of the upper balance weight fitting hand viewed in the direction shown by an arrow XI of FIG. 10;

DETAILED DESCRIPTION OF THE INVENTION

Parts which are not of direct importance to the invention and parts which are purely of conventional construction and function will not be described in detail. For example, details of the positioning means, the balance or unbalance detecting means, the conveyer, and so forth which are necessary to detect the balance weight masses and positions of wheel at which the balance weights are clipped in order to balance a wheel will not be set out in detail since their construction and operation is known to those skilled in the art and can take various forms.

Figure 1A:
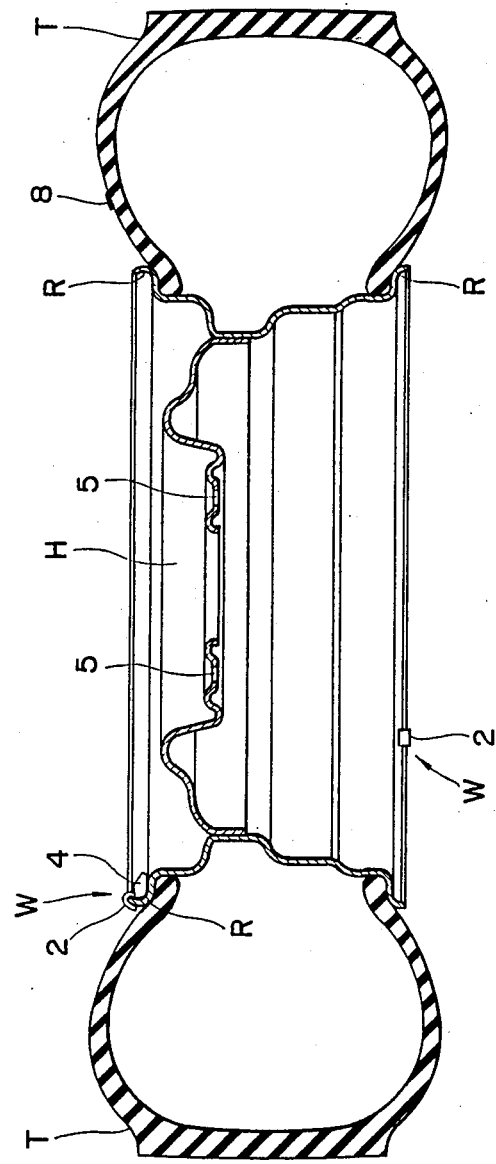
FIG. 1(A) is a cross sectional view of a tire and wheel showing balance weights, fitted thereto in accordance with the apparatus of the present invention.
Figure 1B:
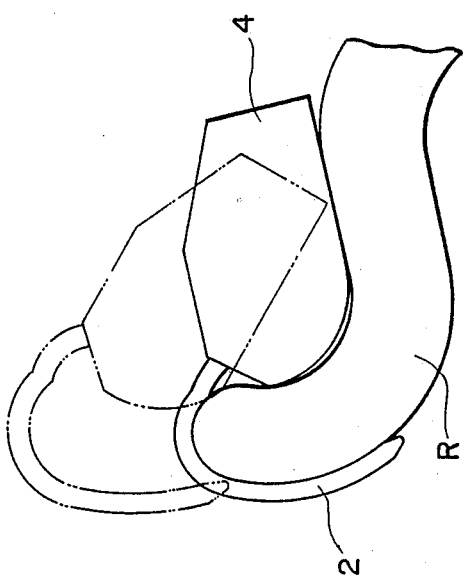
FIG. 1(B) is an enlarged illustration of a balance weight fitted to a rim of the wheel of FIG. 1.

As is well known in the art and shown in FIGS. 1(A) and (B), if a tire and wheel is statically and/or dynamically unbalanced, one or more balance weights W are fitted to a wheel H with or without a tire T ( which is hereinafter referred to a wheel H for simplicity ) to correct unbalance. In more detail, a balance weight W comprises a resiliently deformable clip member 2 and a lead weight member 4 fixed to the clip member 2. The balance weight W is attached to the wheel H by clipping the clip member 2 to the rim edge R of the wheel H.

Figure 2:
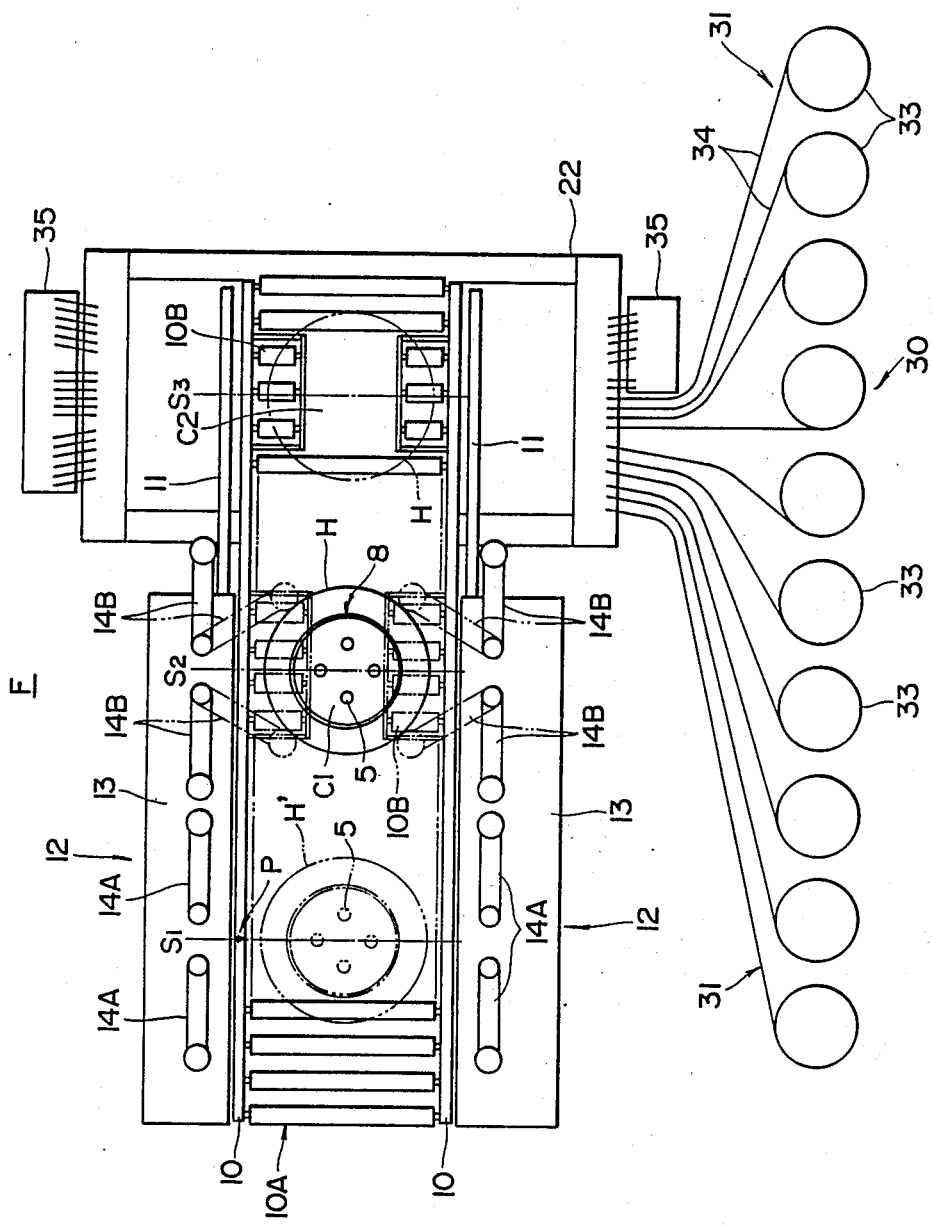
FIG. 2 is a schematic plan view partly diagramatically illustrating an automatic balance weight fitting apparatus embodying the present invention.
Figure 3:
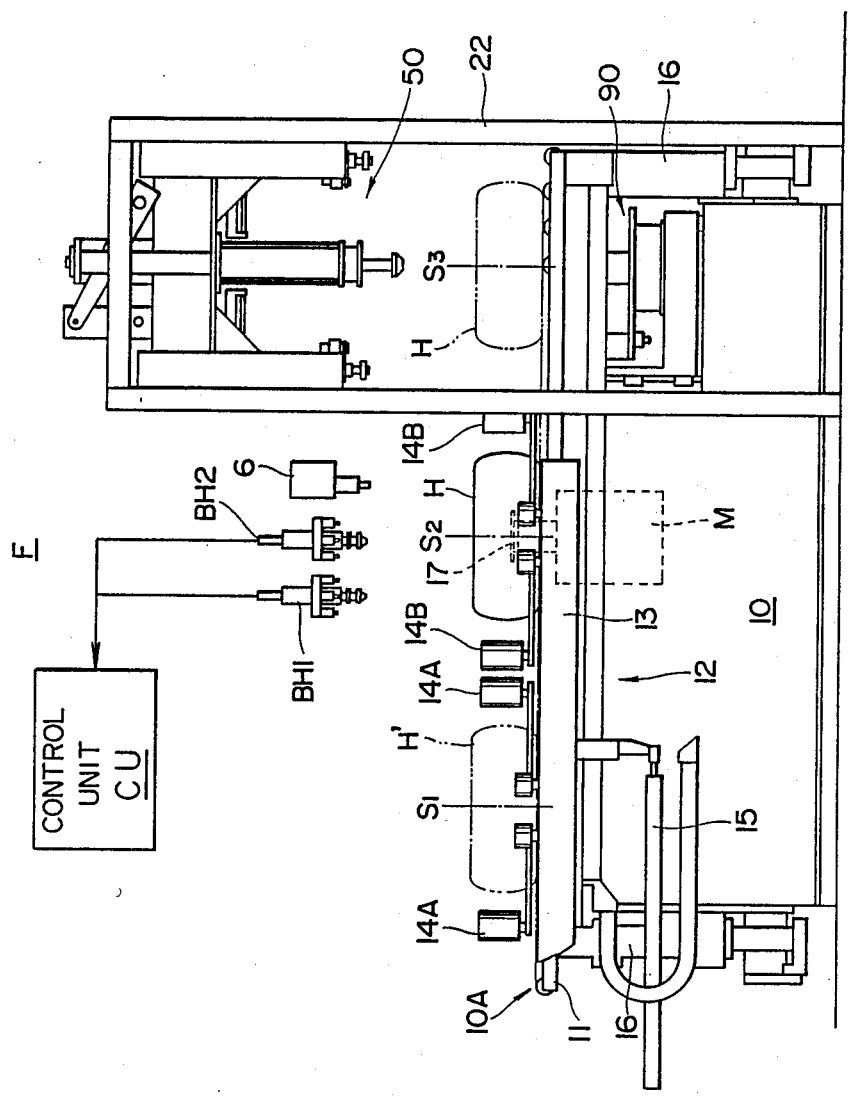
FIG. 3 is a schematic side view illustrating the automatic balance weight fitting apparatus of FIG. 2.

Referring now to FIGS. 2 and 3, a balance weight fitting apparatus F and associated installations are illustrated. As shown, the apparatus F for fitting one or more balance weights to the outer and inner rim edges R of the wheel H has three stations, namely a positioning station S1, a wheel balance measuring station S2, and a balance weight fitting station S3, which are arranged in a line at regular intervals. At the positioning station S1, the wheel H is placed in position with one of mounting holes 5 thereof in alignment with a reference point P marked on the positioning station S1. This alignment may be effected either automatically in any well known manner in the art or manually.

The wheel balance measuring station S2 includes well known wheel balance measuring heads BH1 and BH2 to detect dynamic unbalance, a marker 6 well known per se for printing an index marking 8 such as a white paint marking onto the outer surface of the tire T, and a control unit CU. This control unit CU, which includes a computerized data processing means well known to those skilled in the art, provides various control signals by which associated operating elements of the balance weight fitting apparatus F are sequentially controlled in operation. The control unit CU also processes outputs from the wheel balance measuring head BH1 or BH2 to analyze unbalance of the wheel H and automatically to determine sizes of balance weights which are needed to correct unbalance of the wheel H and angular positions on wheel rim at which the balance weights are fitted so as evenly to distribute the weight mass of the wheel H around the axis of rotation. Information on the size of balance weight and the angular position at which the balance weight is fitted are transmitted as a size and a position signal to balance weight handling means and balance weight fitting means, respectively, incorporated in the balance weight fitting station S3, which is described in detail later.

The white paint index marking 8 applied onto the tire T at the balance measuring station S2 is referred to as an origin with respect to which the angular positions are defined.

This balance weight fitting apparatus F has side frames 10 disposed in parallel with each other. Between the side frames 10 there are a plurality of rollers 10A and 10B which are supported by the side frames 10 for rotation and distributed at equal intervals over the three stations S1, S2 and S3. As is clearly seen in FIG. 2, the rollers 10B which are shorter than the rollers 10A are distributed over the middle section of the balance measuring station S2 and over the balance weight fitting station S3 so as to provide spaces C1 and C2 in the respective stations S2 and S3. On these rollers 10A and 10B the wheel H is placed horizontally. Each side frame 10 is provided at both ends with lifters 16 consisting of, for example, air or hydraulic cylinders for lifting up and down a shuttle type conveyor 12 for conveying the wheel H stepwise, namely from the positioning station S1 to the wheel balance measuring station S2, or from the wheel balance measuring station S2 to the balance weight fitting station S3. The shuttle conveyor 12 consists of a pair of rails 11 extending between and supported by the lifters 16, a pair of shuttle members 13 slidably mounted on the rails 11 and extending long enough to cover at least two stations, a plurality of swingable clamping arms 14A and 14B disposed two pairs on each shuttle member 13 and two pairs for one station, and actuators 15 for reciprocally moving the shuttle members 13. For conveying the wheel H stepwise, the first pair of clamping arms 14A are forced to swing and close so as to clamp the wheel H and, thereafter, the lifters 16 are actuated to lift up the rails 11 with the shuttle members 13. Following the lifting up, the actuators 15 cause the shuttle members 13 to move by a predetermined distance, namely the distance between the centers of the adjacent two stations, so as to displace the wheel H from the positioning station S1 to the wheel balance measuring station S2. After this displacement of the wheel H, the lifters 16 force the shuttle members 13 to descend; the swingable clamping arms 14A open to unclamp and place the wheel H on the rollers 10B.

Under the rollers 10B in the wheel balance measuring station S2, there is a motor M having a wheel mount 17 secured to a rotary shaft thereof. The wheel mount 17 is placed in the space C1 formed between the rollers 10B and slightly projects above the rollers 10B so as to mount thereon the wheel H when the shuttle conveyor 12 is displaced to the right hand side as viewed in FIG. 3 with clamping the wheel H by the clamping arms 14B and descended. The motor M is controlled by the control unit CU to rotate the wheel H at a constant speed during the measurement of wheel balance and to stop after the measurement. Then, the motor M is controlled again to turn gently and less than one revolution so as to place the index marking 8 printed on the tire T at the original position.

Figure 4:
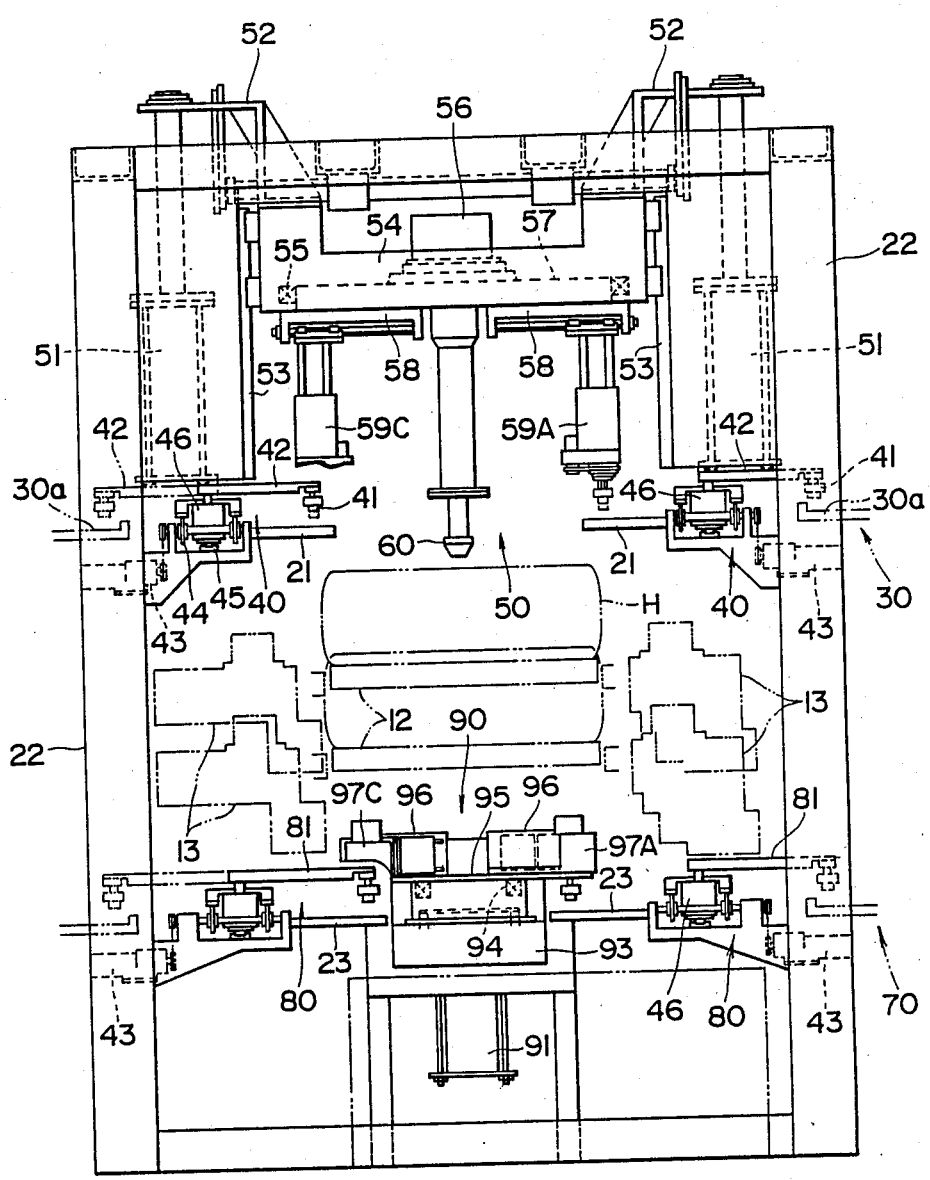
FIG. 4 is view of the automatic balance weight fitting apparatus of FIG. 2.
Figure 5:
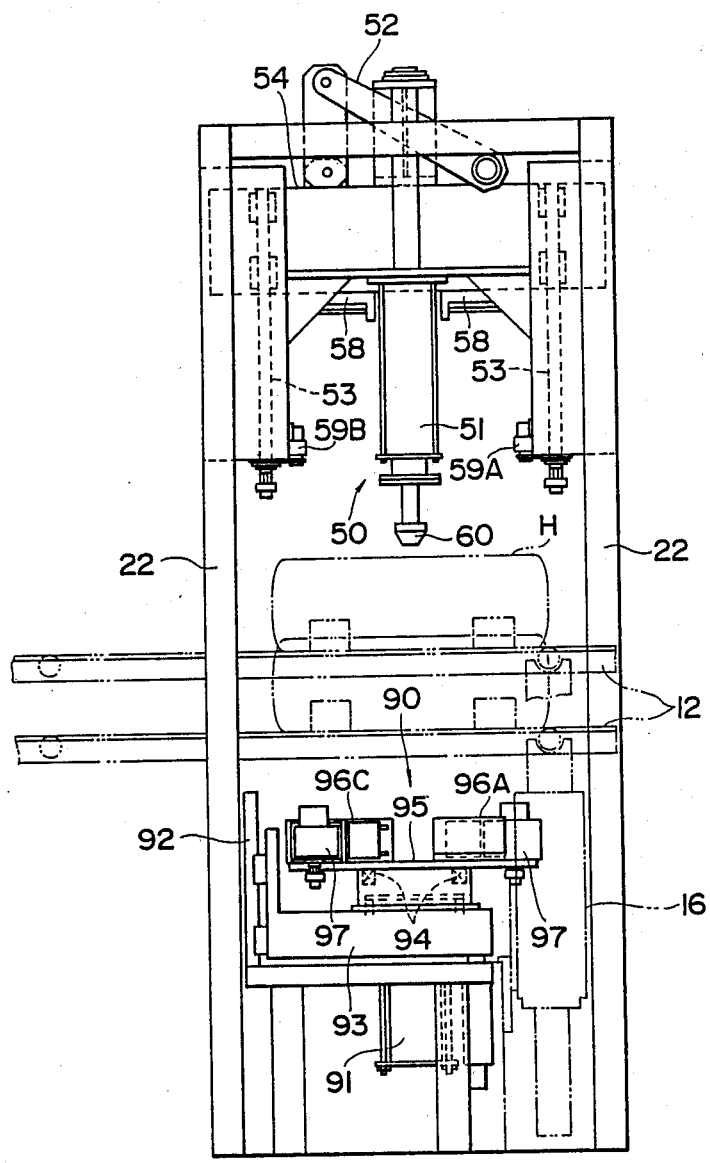
FIG. 5 is side view of a balance weight fitting station of the automatic balance weight fitting apparatus of FIG. 2.
Figure 6:
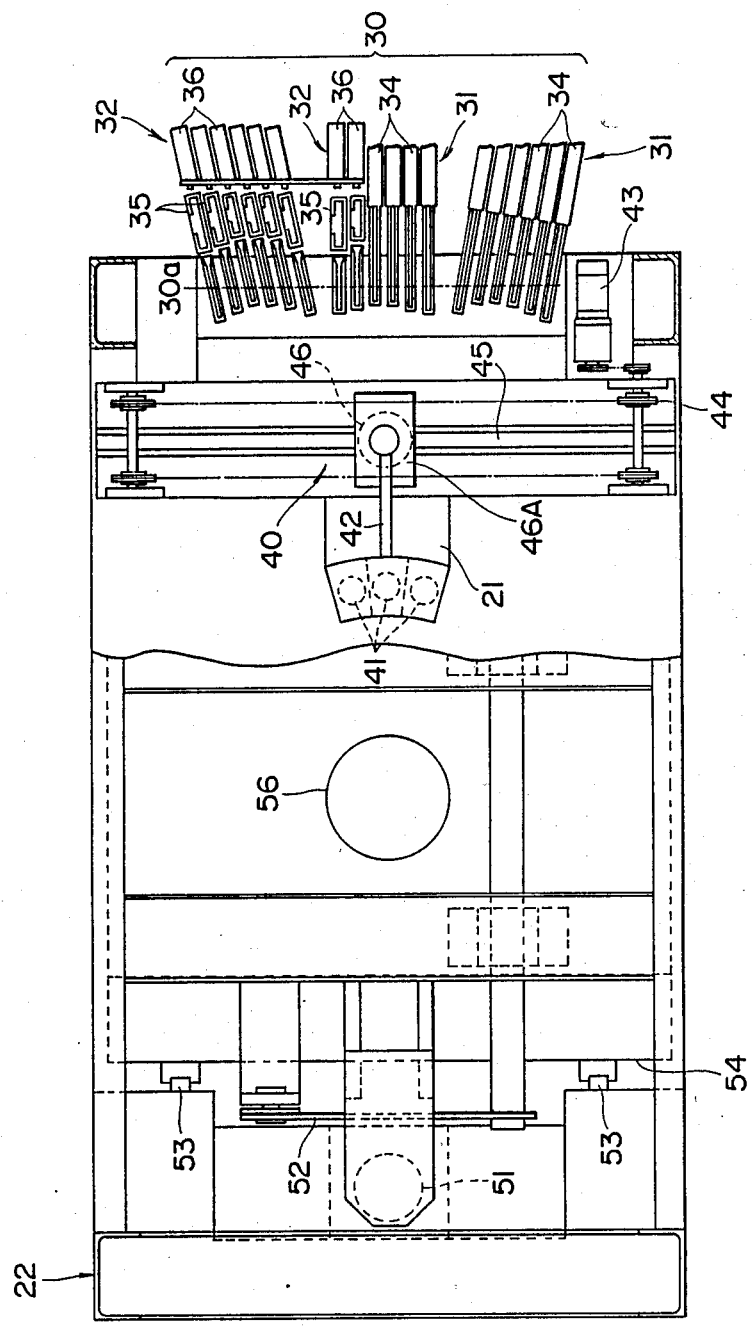
FIG. 6 is a schematic partially cutaway plan view of showing a balance weight pick-up means.

As is shown in FIGS. 4 to 6, the balance weight fitting station S3 includes a fixed frame 22. On opposite sides of the frame 22, there are upper and lower balance weight supplying means 30 and 70 positioned above and below the shuttle conveyer 12 for supplying various grades or sizes of balance weights as will be described in detail later.

Inside the frame 22, there are upper and lower handling means 40 and 80, which include turning arms 42 and 81 identical in operation, respectively for picking up and transferring a balance weight, and upper and lower balance weight fitting means 50 and 90 for clipping or fitting a balance weight to the outer and inner rims R of the wheel H. The upper handling means 40 are provided one individual to each upper balance weight supplying means 30 for transferring a proper size of balance weight from the balance weight supplying means 30 onto an upper balance weight pick-up table 21 and disposed above and on opposite sides of the wheel H placed on the rollers 10B in the balance weight fitting station S3. On the other hand, the lower handling means 80 are also provided one individual to each lower balance weight supplying means 70 for transferring a proper size of balance weight from the balance weight supplying means 70 onto a lower balance weight pick-up table 23 and disposed below and on opposite sides of the wheel H placed on the rollers 10B in the balance weight fitting station S3.

Figure 7:
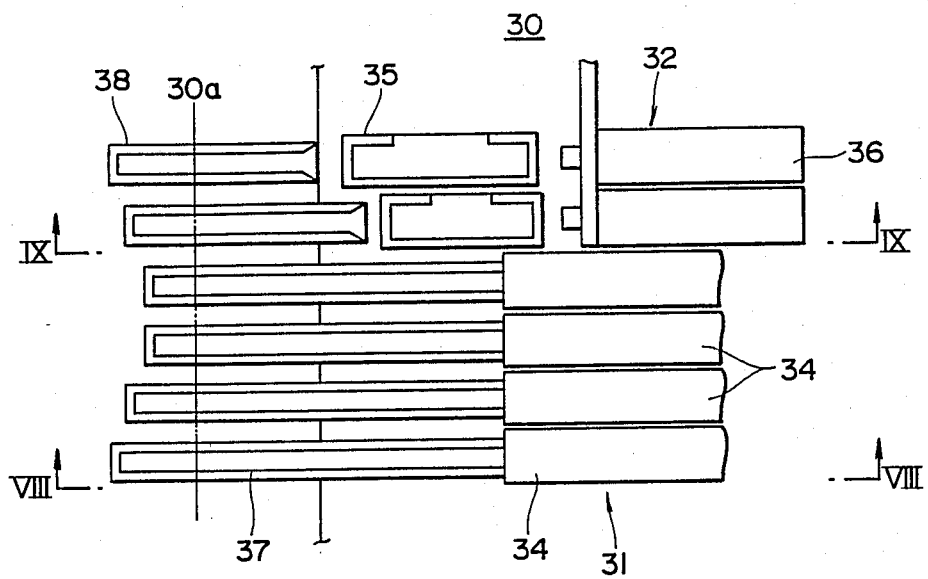
FIG. 7 is a plan view of balance weight supplying means.
Figure 8:
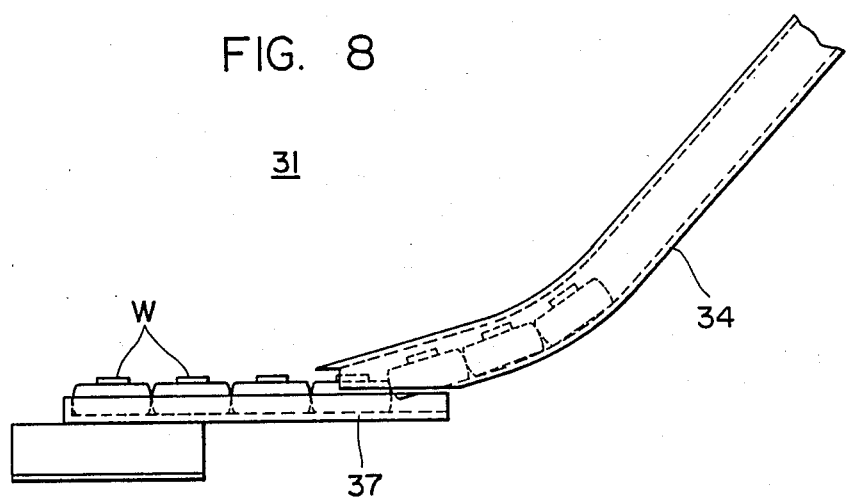
FIG. 8 is a side view taken in the direction of arrows along the line VIII—VIII in FIG. 7.
Figure 9:
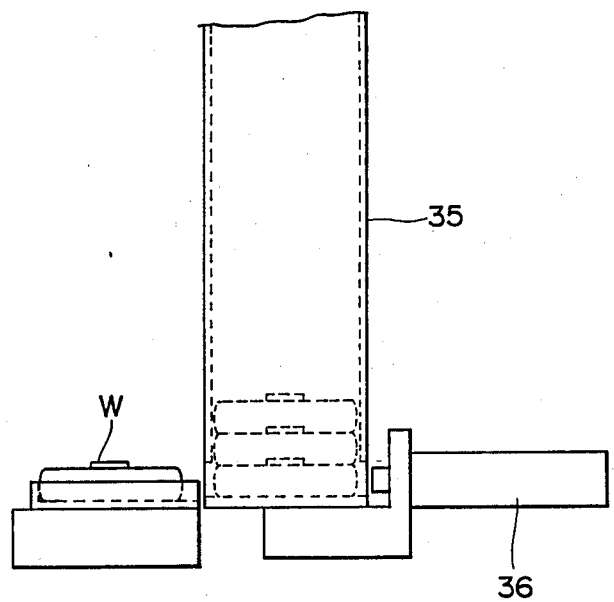
FIG. 9 is a side view taken in the direction of arrows along the line IX—IX in FIG. 7.

Each of the upper and lower balance weight supplying means 30 and 70, as is shown in FIGS. 7 to 9, comprises a plurality of vibrating type balance weight feeders 31 for supplying various sizes of balance weights W which are generally light and different in size and weight, and used in a high frequency; and a plurality of cartridge type balance weight feeders 32 for supplying several sizes of balance weights W which are generally heavy and different in size and weight, and used in a low frequency. Each balance weight feeder 31 is provided with a vibrating bucket 33 (see FIG. 2) well known per se which contains a large number, for example 200 to 300 pieces, of the same size of balance weights therein and is connected to a chute 34. As is well known in the art, the vibrating bucket 33 supplies the balance weights W onto a balance weight holding rack 37 through the chute 34 one by one by vibration.

On the other hand, the cartridge type balance weight feeder 32 includes a plurality of exchangeable cartridges 35 which contain various sizes of balance weights W stacked therein. Each cartridge 35 contains a plurality, for example about 30 pieces, of balance weights W, the lowermost balance weight W in the cartridge 35 being pushed out by a push-out hydraulic or air cylinder 36 onto a balance weight holding rack 38. Holding ends of the balance weight holding racks 37 and 38 are so located that the center of each balance weight in each balance weight holding rack 37, 38 is on a line 30a notionally drawn in FIGS. 6 and 7. It is to be noted that the lower balance weight supplying means 70 may either have another plurality of vibrating buckets or use commonly the plurality of vibration bucket 33 of the upper balance weight supplying means 30.

Each of the upper and lower handling means 40, as is seen clearly in FIG. 6, has the turning arm 42 with three different holding fingers 41 comprising an electromagnetic chuck for electromagnetically chucking and releasing a balance weight W supplied by any one of the balance weight feeders 31 and 32 and placing the chucked balance weight W on the balance weight pick-up table 21, 23. The turning arm 42 is turned through 180° in a horizontal plane by a rotary actuator 46 which is mounted on a slidable bed 46A which slides on a pair of guide rails 45 disposed in parallel with the straight pick-up line 30a. For the sliding movement of the slidable bed 46A, there is a chain driving mechanism comprising a pair of chain belts 44 driven by a motor 43. The motor 43 is caused and controlled by the control unit CU to rotate so as to displace the slidable bed 46A, and hence the holding fingers 41 of the handling means 40 to a position where a balance weight W to be fitted to the wheel H has been supplied by the feeder 31, 32. The reason of the provision of the three different holding fingers 41 is that the balance weights W are different in shape depending on the types of wheels, namely steel wheels, one-piece aluminum wheels and two-piece aluminium wheels. Construction and function of the remaining upper and lower handling means 40 and 80 are the same as those of the handling means 40 described above and need not be explained in detail.

The upper fitting means 50 includes a lift member 54 which is forced to slide up and down on vertical guide rails 53 by a pair of hydraulic or air cylinders 51 through a pair of synchronized linkages 52, a turn table 57 supported by the lift member 54 through a bearing 55 for rotation, three fitting hands 59 each of which is mounted on the under side of a single-head table 58 attached to the turn table 57. The three fitting hands 59 are provided for the same reason as the provision of the three holding fingers 41 of the handling means 40. The turn table 57 is turned by a motor 56 mounted on the lift member 54.

The three single-head tables 58 extend radially with respect to the axis of rotation of the turn table 57 and are coaxially arranged with angular separation, 120°. Each fitting hand 59 is, as is shown in FIGS. 10 and 11, slidably supported by a shift mechanism including horizontal guide rails 58A mounted on the single-head table 58 to move horizontally between the balance weight pick-up table 21 and the wheel H, specifically the rim edge R thereof, placed in position at the fitting station S3. At the center of the turn table 57 there is provided a clamping head 60 which abuts against the center of the wheel H to hold down the wheel H when the lift member 54 comes down.

The fitting hands 59 of the upper fitting means 50 will now be described in greater detail with reference to FIG. 10 and 11. Each fitting hand 59 is rigidly suspended from a holding frame 58E which is threadingly engaged with a threaded shaft 58B and guided by a guide bar 58A mounted on the single-head table 58. The threaded shaft 58B is rotated by a stepping motor 58C through a gear train 58D. This motor 58C is actuated and controlled by the control unit CU to make a predetermined number of revolutions so as to shift radially the fitting hand 59 to a position overhead the rim R of the wheel H placed at the balance weight fitting station S3. The fitting head 59 thus supported has at the lower end a swingable electromagnetic chuck 61 for chucking a balance weight W placed on the pick-up table 21, a rotary actuator 63 for turning the electromagnetic chuck 61 a right angle through a driving belt 62, an air or hydraulic cylinder 64 for moving up and down the electromagnetic chuck 61 so as to fit a balance weight W attracted thereto to the outer rim R of the wheel H placed at the balance weight fitting station S3, a coil spring 65 for supporting and allowing the electromagnetic chuck 61 to swing back when a reaction force is excessively exerted on the electromagnetic chuck 61 upon fitting a balance weight to the outer rim R of the wheel H, and a pair of holding rods 66 for holding down the wheel H upon fitting the balance weight W to the rim R of the wheel H.

The lower balance weight fitting means 90, which is quite similar to the upper balance weight fitting means 50 in construction, comprises a lift member 93 forced to slide up and down on a guide rail 92 by means of a hydraulic or air cylinder 91, a turn table 95 rotatably supported by the lift member 93 through a bearing 94 which is caused to turn by means of a motor (not shown), and three fitting hands 97 each being mounted on the turn table 95 by means of a single-head table 96. The three single-head tables 96 extend radially with respect to the axis of rotation of the turn table 95 and are coaxially arranged with angular separation, 120°. Each fitting hand 97 is slidably supported by a shift mechanism so as to move horizontally between the balance weight pick-up table 23 and the wheel H, in particular, the rim R thereof, placed in position at the balance weight fitting station S3.

Figure 12:
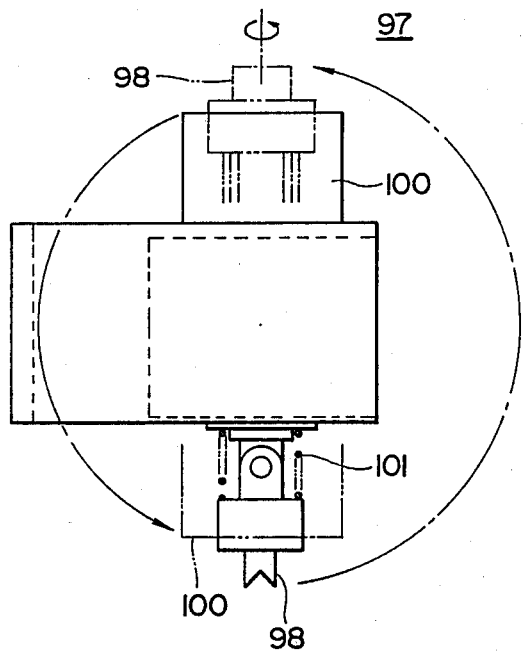
FIG. 12 is a side view of a lower balance weight fitting hand.
Figure 13:
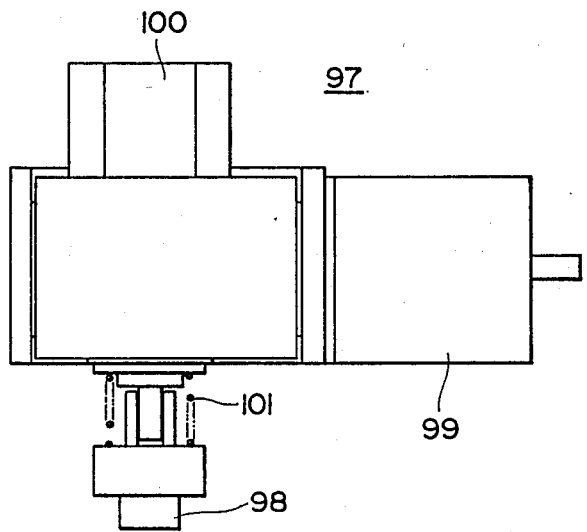
FIG. 13 is a side view of the lower balance weight fitting hand with its electromagnetic chuck turned through 90 degrees.

As is shown in FIG. 12, each fitting hand 97 of the lower balance weight fitting means 90 consists of a swingable electromagnetic chuck 98 for chucking a balance weight W placed on the lower balance weight pick-up table 23, a rotary actuator 99 for turning the fitting hand 97 itself about its horizontal axis through 180° so as to place it upside down while turning the swingable electromagnetic chuck 98 about its vertical axis through 90°, an air or hydraulic cylinder 100 for forcing the swingable electromagnetic chuck 98 to protrude when fitting the chucked balance weight W to the rim edge of the wheel H, and a coil spring 101 for supporting and allowing the swingable electromagnetic chuck 98 to swing back when a reaction force is excessively exerted on the swingable electromagnetic chuck 98 upon fitting the balance weight to the inner rim R of the wheel H.

The above-described operating elements provided in association with the balance weight fitting station S3 are all actuated and program-controlled by the control unit CU to effect their own sequential operations as described.

Figure 14A:
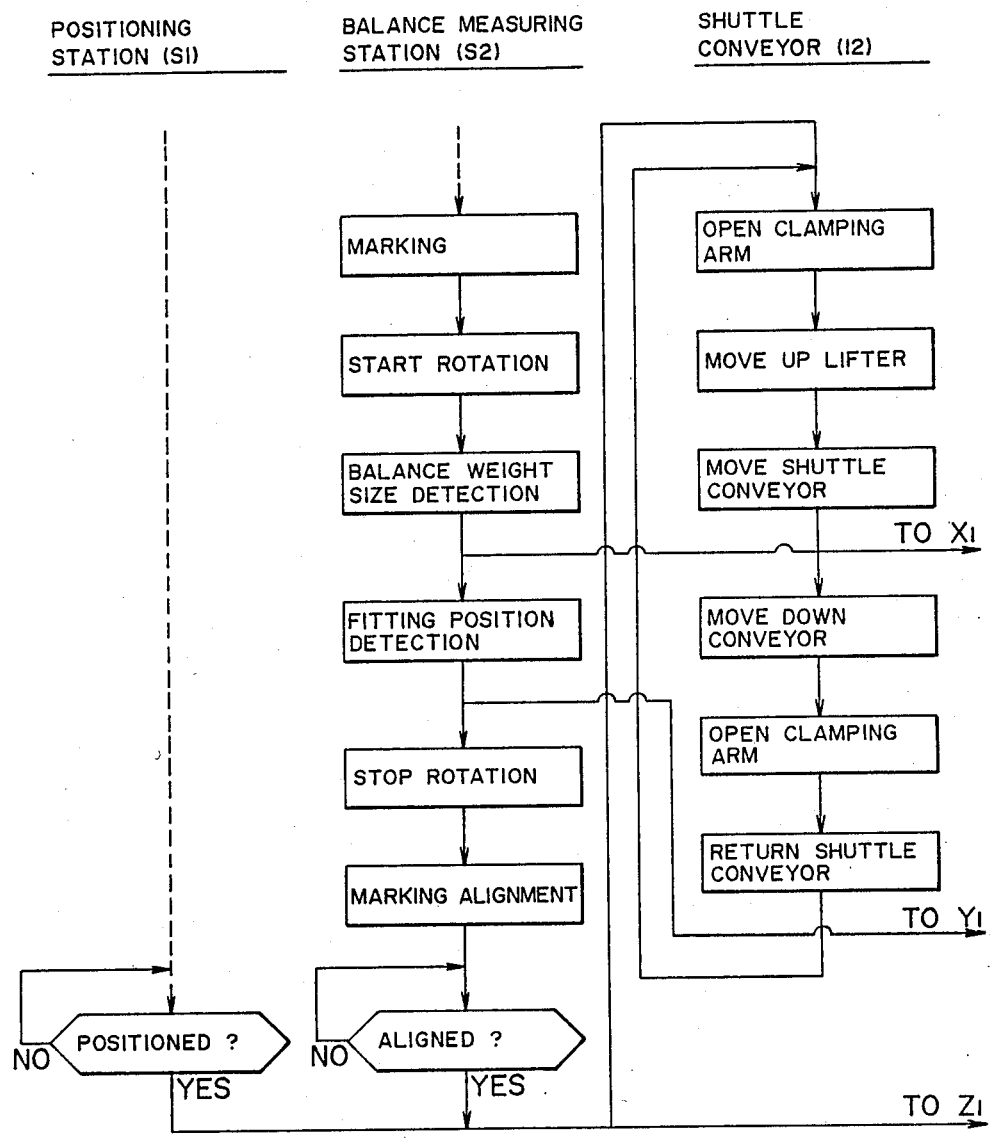
FIG. 14(A), (B) and (C) are charts showing a sequential control of operation of the balance weight fitting apparatus of FIG. 2.
Figure 14C:
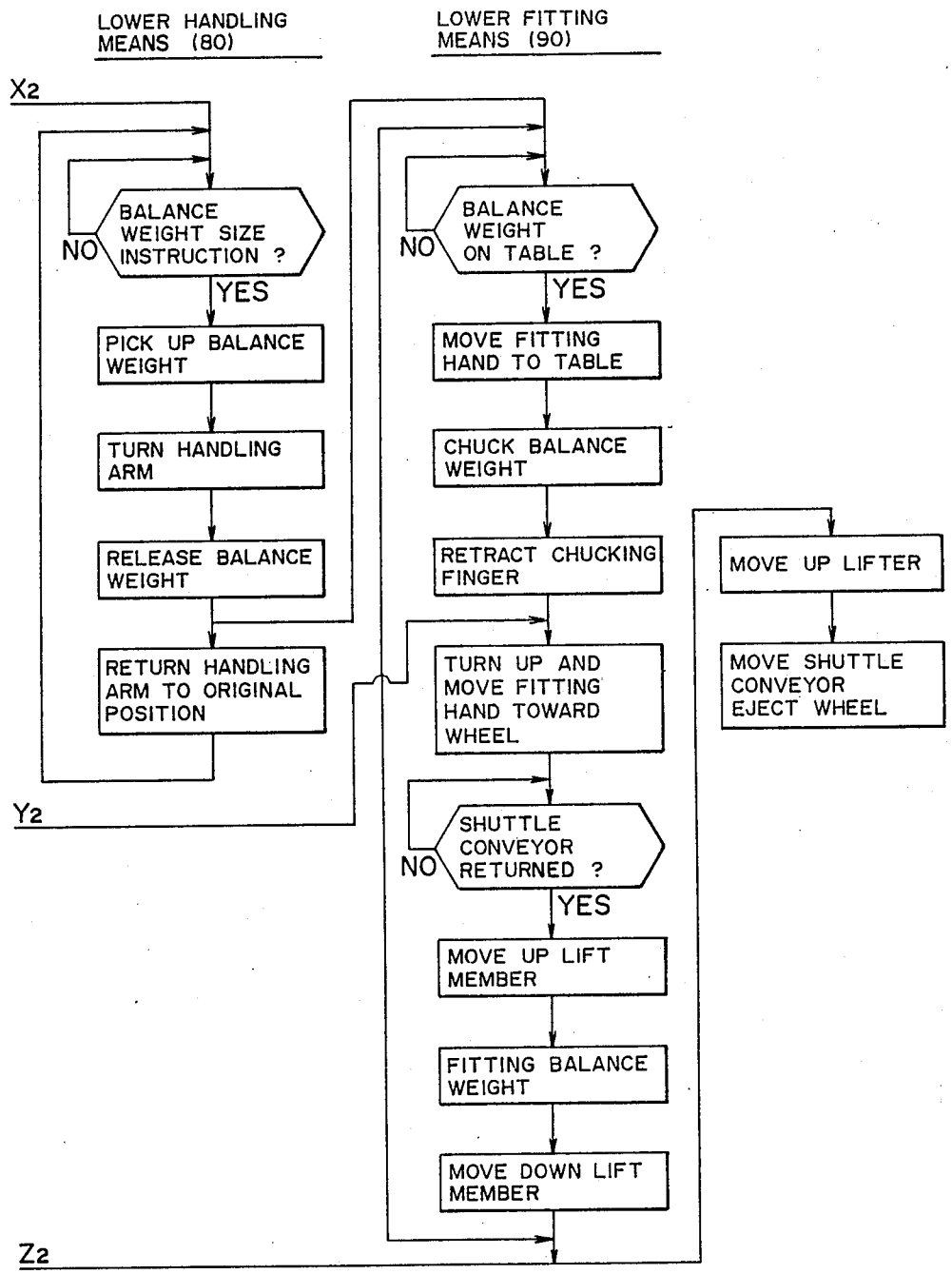

The fitting of balance weights to the rim R of the wheel H will now be described with reference to FIGS. 14(A) to (C). The wheel H is placed at a predetermined position on the rollers 10A in the positioning station S1. As described previously, the wheel H may be placed in position on the rollers 10A either automatically by means of a well known positioning device or manually. When the controller CU detects that the wheel H is placed in position, it executes the programmed-sequential control of operation. As the first sequential control of operation, the clamping arms 14A are actuated to clamp the wheel H placed in the positioning station S1; while the lifters 16 lifts up the shuttle conveyer 12, the actuator 15 is activated to move horizontally the shuttles 13 by the predetermined distance toward the balance weight measuring station S2, placing the wheel H just above the wheel mount 17 of the motor M. While the lifters 16 lift down the shuttle conveyer 12, the clamping arms 14A swing back and open to unclamp the wheel H so as to mount it on the wheel mount 17 of the motor M. Following the mounting of the wheel H, the shuttle conveying 12 returns to its initial position shown in FIG. 3 and the marker 6 prints an index marking 8 on the outer surface of the tire T.

The balance measuring head BH1 comes down to join its spindles to the mounting holes 5 of the wheel H. Thereafter, the motor M is actuated to rotate the wheel H at a constant speed of rotation. As the wheel H turns, the balance measuring head BH1 detects vibrations of the wheel H to provide electrical outputs which in turn are transmitted to the controller CU. If in fact the wheel H is in unbalance, the controller CU analyzes the vibration of the wheel H automatically to determine what sizes of balance weights have to be attached and how to distribute the balance weights to the wheel H evenly to distribute the weight mass of the wheel H around the axis of rotation of the wheel H. As a result of this analysis, the control unit CU provides weight size signals and angular position signals with respect to the index marking 8 printed on the tire T of the wheel H. After this balance measurement, the motor M is stopped instantly and then restarted to place the wheel H in position. For the positioning of the wheel H, the balancer BH1 detects the initial angular position of the wheel H to provide the control unit CU with a signal. According to the signal, the control unit CU stops the motor M to locate the wheel H at the specified initial position.

When the wheel H is located in position, the clamping arms 14B are actuated to swing and close so as to clamp the wheel H. Simultaneously, the clamping arms 14A are also actuated to close and clamp another wheel H' placed on the rollers 10A in the wheel positioning station S1. The shuttle conveyer 12 is caused to convey the wheel H from the wheel balance measuring station S2 to the balance weight fitting station S3 in the same manner as described as to the conveying of the wheel H from the positioning station S1 to the balance weight measuring station S2. At this time, the wheel H is maintained in said specified position and placed over the space provided between the shorter rollers 10B. After the placing of the wheel H, the clamping arms 14A and 14B swing back and open to unclamp the wheels H and H'; the shuttle conveyer 12 is lifted up by the lifter 16 and is returned by the actuator 15 to its initial position shown in FIG. 3. At this time, the wheel H placed in the balance weight fitting station S3 is held down. The clamping head 60 may be rotated slowly by means of a motor (not shown) to turn the wheel H so as to detect the index marking 8 printed on the tire T by an index marking detector (not shown) such as a photo-electric light detector. When the index marking 8 is detected, the index marking detector provides a signal which in turn is transmitted to the control unit CU so as to stop the motor. In such a way, the wheel H can be accurately positioned in the balance weight fitting station S3. Owing to the provision of the index marking detector, the wheel can be placed in position even when being deviated in angular position during the displacement thereof from the balance measuring station S2 to the balance weight fitting station S3.

While conveying the wheel H to the balance weight fitting station S3, the control unit CU causes each of the upper and lower handling means 40 and 80 to hold one of balance weights W fed by the vibrating containers 23 and exchangeable cartridges 25. For this handling, the control unit CU outputs a weight size signal to the driving motor 43 in association with each handling means 40, 80. According to the weight size signal, the motor 43 rotates to move the sliding bed 46A, and hence the handling means 40, to a position where a balance weight having the size determined by the control unit CU is in the balance weight holding rack 37 and 38. Thereafter, the rotary actuator 46 is actuated to turn the turning arm 42 through 180° and the holding finger 41 is energized to attract or chuck the determined size of balance weight W. Then, the rotary actuator 46 is reversed to return and place the holding finger 41 overhead the upper balance weight pick-up table 21. The holding finger 41 is deenergized so as to release the balance weight W on the pick-up table 21. Thereafter, the handling means 40 returns to its initial position. As the lower handling means 80 operates to pick up a determined size of balance weight and bring it onto the lower balance weight pick-up table 23 in the same manner as the handling means 40, operation of the lower handling means 80 need not be explained.

Following the bringing of the determined size of balance weights W to be fitted to the outer and inner rims R of the wheel H, the control unit CU actuates the upper fitting means 50 according to the provision of an angular position signal. The motor 56 and motor 58C of the single-head table 58 are actuated, turning the turn table 57 and sliding outwardly the supporting slide 48E so as to locate one of the fitting hands 49A to 49C, for example the fitting hand 49A, just above the upper balance weight pick-up table 21. Thereafter, the hydraulic or air cylinder 64 is actuated to gradually protrude the electromagnetic chuck 61 until reaching the balance weight W on the balance weight pick-up table 21. After the electromagnetic chuck 61 is energized to chuck or attract the balance weight W, the hydraulic or air cylinder 64 retracts the electromagnetic chuck 61 with the balance weight W chucked thereby.

As the following step in the sequential control of operation, the control unit CU actuates the fitting means 50 to locate the fitting hand 59 overhead the outside rim R of the wheel H where the balance weight W is clipped or fitted. Specifically, the motor 56 is reversed to turn through a certain angle according to the angular position signal from the control unit CU so as to locate the electromagnetic chuck 61 at the determined angular position with respect to the index marking 6, while the motor 58C is caused to turn so as to turn the adjusting screw 58B in order to slide radially inwardly the single-head table 58 with the upper fitting hand 59A. Thereby, the fitting hand 59 with the balance weight W chucked by the electromagnetic chuck 61 is located above the position of the outer rim edge R where the balance weight W is clipped or fitted to the rim edge R of the wheel H. Then, the hydraulic or air cylinders 51 are actuated to force the lifter 54 to gradually move down so that the fitting hand 59 approaches the wheel H. When the clamping heads 66 holds down the wheel H and the control unit CU detects that the moving up of the lower lifter 93, the hydraulic or air cylinder 64 of the upper fitting hand 59 is actuated to move down the electromagnetic chuck 61 so as to fit the clip 2 of the balance weight W to the outer rim edge R of the wheel H and to seat the lead weight 4 in the recessed section of the rim R. After the fitting of the balance weight W to the outer rim R, the hydraulic or air cylinders 51 moves up so as to lift up the lifter 54 to its initial position.

While the fitting of the balance weight W to the outer rim R of the wheel H, the control unit CU actuates the lower fitting means 90 to clip a proper size of balance weight to the inner rim edge R of the wheel H substantially in a quite similar manner as the upper fitting means 59. Specifically, when the control unit CU provides a weight size signal, the lower handling means 90 selects the determined size of balance weight and displaces it onto the lower balance weight pick-up table 23 from the balance weight holding rack of the lower balance weight supplying means 70. The fitting means 90 moves overhead the balance weight pick-up table 23 so as to electromagnetically chuck the determined size of balance weight W by the electromagnetic chuck 98. Before being moved below a position of the inner rim R at which the determined size of balance weight W is clipped to the inner rim edge R of the wheel H according to an angular position signal from the control unit CU, the rotary actuator 46 is actuated so that the fitting hand 97 is turned about the horizontal axis through 180 and positioned upside down. When the shuttle conveyer 12 is displaced out of the balance weight fitting station S3, the hydraulic or air cylinder 100 of the fitting hand 97 is actuated under the control of the control unit CU to move up the electromagnetic chuck 98 so as to fitting the balance weight W to the inner rim edge R of the wheel H at the determined position. Thereafter, the hydraulic or air cylinder 100 of the fitting hand 97 moves down the electromagnetic chuck 98 while the actuator 93 is reversed to return the fitting hand 97 to its original position.

The wheel H which is well balanced by fitting the balance weights to the outer and inner rim edges thereof is pushed out of the balance weight fitting station S3 by the another wheel H' which is clamped by the clamping arms 14B and conveyed by the shuttle conveyer 12 to the balance weight fitting station S3 from the wheel balance measuring station S2. In the above described embodiment of the present invention, although a balance weight is previously integrated with a resiliently deformable clip member as one piece, it is permissible to use separated lead balance weight and clip member. In this case the, the balance weight fitting apparatus is used in order to attach the lead balance weight to the clip which is clipped to the rim edge of the wheel. Furthermore, a lead balance weight without clip member which is suitable for aluminum wheels may be directly cemented to the rim of the wheel by using the balance weight fitting apparatus of the present invention.

Although the present invention has been fully described by way of the preferred embodiment thereof with reference to the accompanying drawings, it is to be noted that various modifications and changes are apparent to those skilled in the art. Therefore, unless otherwise such modifications and changes depart from the true scope of the present invention, they should be construed as included therein.

What is claimed is:

1. A balance weight fitting apparatus comprising a balance measuring station and a balance weight fitting station for fitting balancer weights to a rim edge of a wheel placed in said balance weight fitting station according to unbalance of said wheel, means disposed in said balance measuring station for detecting unbalance of said wheel placed in said balance measuring station to provide a weight size signal indicating weight size of balance weight to be fitted to said rim edge of said wheel and an angular fitting position at which said rim edge of said wheel is fitted with said indicated weight size of balance weight;

upper and lower balance weight supplying means, each being disposed out of said balance weight fitting station for supplying and distributing various sizes of balance weights in a line on a pick-up table;

upper and lower pick-up means disposed in said balance weight fitting station, each being caused by said weight size signal to move to a balance weight of a weight size indicated by said weight size signal on said pick-up table for picking up and bringing said balance weight of a weight size indicated said weight size signal near a position where said wheel is placed ion said balance weight fitting station; and upper and lower balance weight fitting means disposed in said balance weight fitting station, each being caused by said weight size signal for holding and fitting said indicated balance weight to said trim edge of said wheel at a position indicated by said fitting position signal, wherein said balance weight supplying means includes a plurality of vibrating bucket type balance weight feeders each of which contains therein a same size of balance weights used with a high frequency and a plurality of cartridge type balance weight feeders each of which contains therein a stack of a same size of balance weights used with a low frequency.

2. An apparatus as defined in claim 1, wherein each of said plurality of buckets is common to both of said upper and lower balance weight supplying means.

3. An apparatus as defined in claim 1, wherein each of said plurality of cartridge type balance weight feeders comprises an exchangeable cartridge with a stack of a same size of balance weights contained therein and means for pushing out the lowermost balance weight of said stack of balance weights onto said pick-up table.

4. A balance weight fitting apparatus comprising a balance measuring station, a balance weight fitting station located after said balance measuring station, and a conveyor for conveying said wheel from said balance measuring station to said balance weight fitting station;

balance measuring means disposed in said balance measuring station for measuring unbalance of said wheel placed on said conveyor in said balance measuring station to provide weight size signals indicating weight sizes of balance weights to be fitted to at least one of inner and outer rim edges of said wheel and balance weight fitting position signals indicating balance weight fitting angular rim positions with respect to a specified angular rim position at which said at least one of outer and inner rim edges of said wheel is fitted with said indicated weight sizes of balance weights;

wheel positioning means disposed in said balance measuring station for positioning said wheel on said convey or so as to coincide one angular rim position of said balance weight fitting angular rim positions and said specified angular rim position with a fixed position of said balance measuring station;

upper and lower balance weight fitting means disposed in said balance weight fitting station for fitting balance weights of weight sizes indicated by said weight size signals to at least one of said outer and inner rim edges of said wheel placed on said conveyor in said balance weight fitting station at said balance weight fitting angular rim positions indicated by said balance weight fitting position signals;

upper and lower balance weights suypplying means each of which is disposed adjacent to said balance weight fitting station for supplying and distributing various sizes of balance weights on a pick-up table; and upper and lower pick-up means disposed in said balance weight fitting station, each of which is moved to pick up balance weight of a weight size indicated by said weight size signal on said pick-up table and bring it toward said wheel placed on said conveyor in said balance weight fitting station, said balance weight supplyoing means including a plurality of vibrating bucket type balance weight feeders, each of which contains balance weights used with a high frequency, and a plurality of cartridge type balance weight feeders, each of which contains balance weights used with a low frequency.

5. A balance weight fitting apparatus comprising a balance measuring station, a balance weight fitting station adjacent to said balance measuring station and a conveyor for conveying a wheel from said balance measuring station to said balance weight fitting station, balance measuring means disposed in said balance measuring station for measuring unbalance of said wheel placed on said conveyor in said balance measuring station to provide weight size signals indicating weight sizes of balance weights to be fitted to inner and outer rim edges of said wheel and balance weight fitting position signals indicating balance weight fitting positions on said inner and outer rim edges of said wheel where balance weights with indicated weight sizes of balance weights are fitted;

upper and lower balance weight supplying means, each including pick-up tables and being disposed adjacent to said balance weight fitting station for supplying and distributing various sizes of balance weights on said pick-up tables;

upper and lower pick-up means disposed in said balance weight fitting station, each being caused by said weight size signal to move to a balance weight of a weight size indicated by said weight size signal on said pick-up table for picking up and bringing said balance weight of a wight size indicated by said weight size signal near a position where said wheel is placed in said balance weight fitting station; and upper and lower balance weight fitting means disposed in said balance weight fitting station and having at least one balance weight fitting hand, respectively, said balance weight fitting hand of at least one of said upper and lower balance weight fitting means being able to turn around the axis of rotation of said wheel according to said balance weight fitting positions, said balance weight supplying means including a plurality of vibrating bucket type balance weight feeders each of which contains therein a same size of balance weights used with a high frequency and a plurality of cartridge type balance weight feeders each of which contains therein a stack of same size of balance weights used with a low frequency.

* * * * *